United States Patent [19]

VanderLaan

[11] Patent Number: 4,943,111
[45] Date of Patent: Jul. 24, 1990

[54] CONTAINER HOLDER FOR A VEHICLE

[75] Inventor: Kenneth J. VanderLaan, Holland, Mich.

[73] Assignee: Prince Corporation, Holland, Mich.

[21] Appl. No.: 225,083

[22] Filed: Jul. 26, 1988

[51] Int. Cl.$^5$ ............................................. A47C 7/62
[52] U.S. Cl. .................... 297/194; 248/311.2
[58] Field of Search ............... 297/194, 192, 188;
108/25, 26, 44, 45, 46; 248/311.2, 313, 316.4,
154, 225; 220/85 H, 341, 349; 224/148, 42.45 R;
206/387

[56] References Cited

U.S. PATENT DOCUMENTS

| | | |
|---|---|---|
| 1,550,055 | 8/1925 | Augustine . |
| 1,902,608 | 3/1933 | Baltzley et al. . |
| 2,314,935 | 3/1943 | Gutterman . |
| 2,550,019 | 4/1951 | Murphy ........................ 248/311.2 |
| 2,670,124 | 2/1954 | Buchmiller et al. . |
| 2,826,346 | 3/1958 | Randall . |
| 2,875,940 | 3/1959 | Dunn . |
| 2,932,423 | 4/1960 | Baumgartner . |
| 3,083,998 | 4/1963 | Morris . |
| 3,317,171 | 5/1967 | Kramer ........................ 248/311.2 X |
| 3,326,445 | 6/1967 | Goings . |
| 3,497,076 | 2/1970 | O'Brien . |
| 3,508,732 | 4/1970 | Trachtenberg et al. ..... 224/42.45 R X |
| 3,606,112 | 9/1971 | Cheshier . |
| 3,638,849 | 2/1972 | Goings . |
| 3,690,724 | 10/1972 | Douglas et al. . |
| 3,951,448 | 4/1976 | Hawie . |
| 4,040,659 | 8/1977 | Arnold . |
| 4,138,055 | 2/1979 | Harrison . |
| 4,163,374 | 8/1979 | Moore et al. . |
| 4,417,764 | 11/1983 | Marcus et al. . |
| 4,500,145 | 2/1985 | Fassauer . |
| 4,521,056 | 6/1985 | Lindenmuth . |
| 4,535,923 | 8/1985 | Manke ...................... 224/42.45 R X |
| 4,591,206 | 3/1986 | Pribble . |
| 4,629,153 | 12/1986 | Marcum .................... 224/42.45 R X |
| 4,649,714 | 3/1987 | Lee . |
| 4,666,041 | 5/1987 | Gordon . |
| 4,756,459 | 7/1988 | Hardman ........................ 206/387 X |
| 4,783,037 | 11/1988 | Flowerday ..................... 297/194 X |
| 4,792,184 | 12/1988 | Lindberg et al. .............. 297/150 X |

FOREIGN PATENT DOCUMENTS

| | | |
|---|---|---|
| 443562 | 4/1957 | Fed. Rep. of Germany . |
| 638983 | 6/1928 | France . |
| 1555210 | 1/1969 | France . |
| 2278244 | 2/1976 | France . |
| 2029197 | 3/1980 | United Kingdom ............ 248/297.2 |

Primary Examiner—Jose V. Chen
Attorney, Agent, or Firm—Price, Heneveld, Cooper, DeWitt & Litton

[57] ABSTRACT

A container holder for a vehicle is stored in an armrest and is pivoted to a use position exposing a pair of container supports. One container support slides relative to the other such that facing surfaces thereof can engage the opposite sides of different diameter containers.

21 Claims, 3 Drawing Sheets

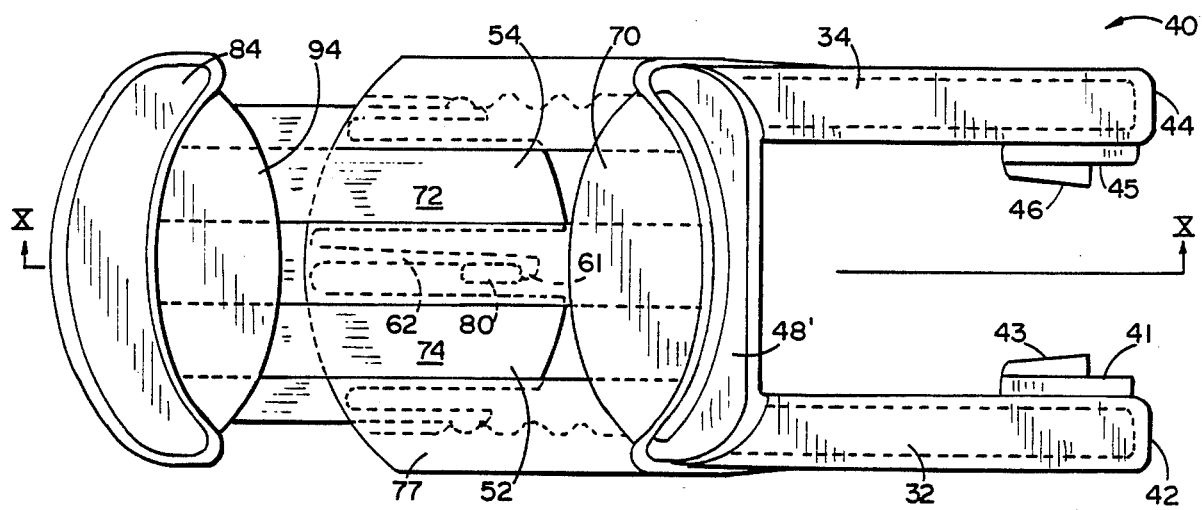
FIG. 8
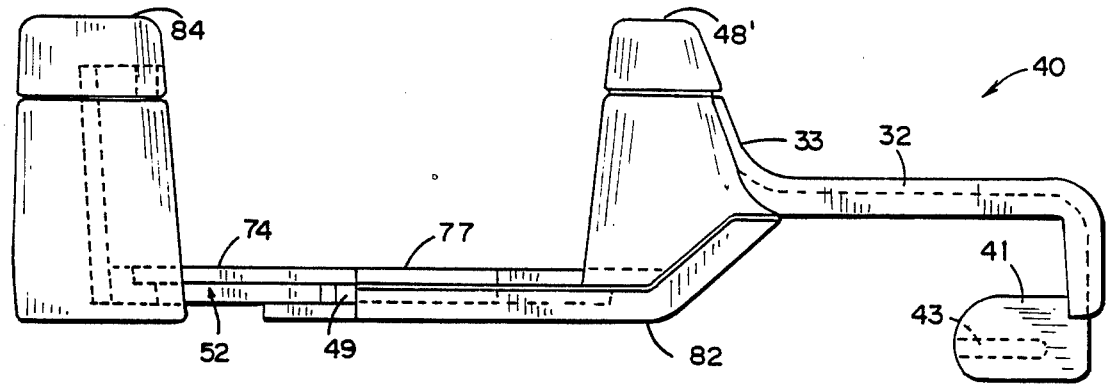
FIG. 9
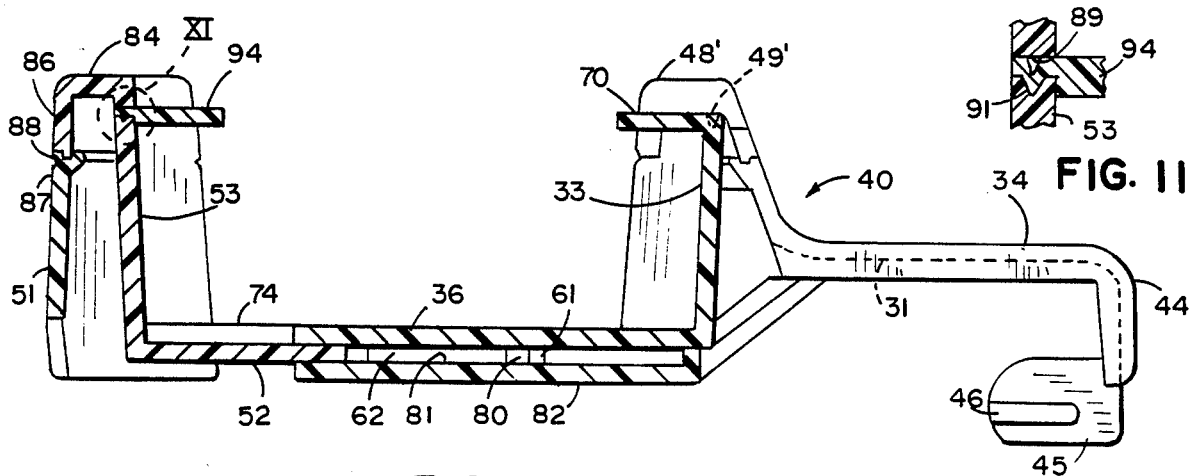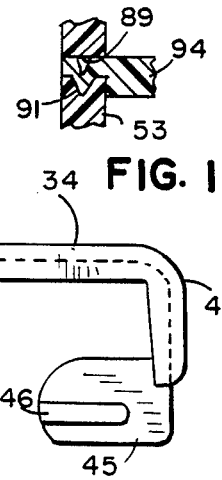
FIG. 10
FIG. 11

4,943,111

CONTAINER HOLDER FOR A VEHICLE

BACKGROUND OF THE INVENTION

The present invention relates to container holders for a vehicle and more particularly an armrest within a vehicle.

There exists a variety of cup holders or container holders utilized for supporting cups, cans and other beverage containers in a vehicle such that the vehicle occupants can support such beverages while in the vehicle. U.S. Pat. No. 4,417,764 issued Nov. 29, 1983 is representative of one cup holder structure which is incorporated in the armrest of a vehicle and which can accommodate such containers. U.S. Pat. No. 3,326,445 discloses a disposable container holder for use on a car seat. U.S. Pat. Nos. 3,497,076 and 4,040,659 also disclose cup holders which move from a storage position within a support structure in an automobile to a use position.

Although these various cup holders are useful for single or limited sized containers, the system of the present invention is adapted to accommodate a variety of different sized beverage containers such as cans, coffee mugs, large cups and the like. Also, it is shaped to fit within a relatively narrow armrest.

SUMMARY OF THE PRESENT INVENTION

Container holders embodying the present invention include a support structure within a vehicle for the holder and a holder movably mounted within the support for movement between stored and use positions. The holder includes a container supporting element extending in a generally horizontal plane when in a use position with the element including means defining support edges of adjustable dimensions for engaging the sidewalls of a beverage container.

In one embodiment of the invention, the means for defining the support edges comprises a sliding member which is adjustable with respect to the supporting element to define opposing support edges with adjustable spacing therebetween. In a preferred embodiment of the invention, the container holder is mounted within an armrest of a vehicle and particularly a storage container for the armrest. The holder in the preferred embodiment is pivotably and slidably mounted within the armrest for movement between a stored position within the armrest and a use position extended from the armrest.

These and other features, objects and advantages of the present invention will become apparent upon reading the following description thereof together with reference to the accompanying drawings in which:

BRIEF DESCRIPTION OF THE DRAWINGS

FIG. 8 is a top plan view of the assembled container holder;

FIG. 9 is a front elevational view of the container holder shown in FIG. 8;

FIG. 10 is a cross-sectional view of the container holder taken along section line X—X of FIG. 8; and FIG. 11 is an enlarged fragmentary cross-sectional view of a portion of the structure shown in FIG. 10.

DETAILED DESCRIPTION OF THE PREFERRED EMBODIMENT

Figure 1:
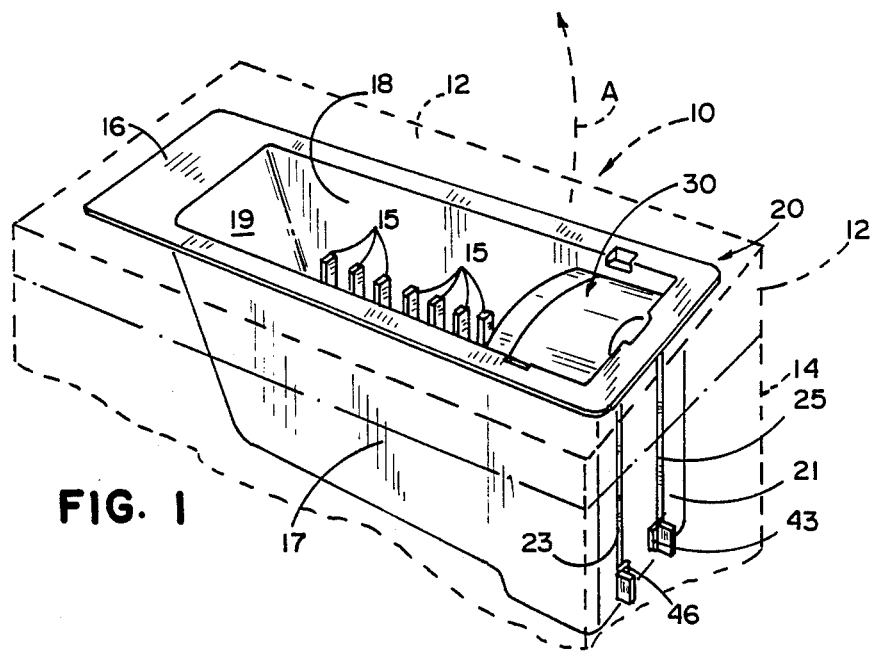
FIG. 1 is a perspective view partly in phantom form of an armrest embodying the container holder of the present invention.

Referring initially to FIG. 1, there is shown in phantom form an armrest 10 having a pivoted cover 12 for a hollowed lower body 14 into which there is mounted in a conventional manner a housing 20 for the container holder assembly 30 of the present invention. The integrally molded housing 20 defines a storage receptacle having a floor 13, a peripheral generally horizontal extending upper flange 16, sidewalls 17 and 18, an inclined rear wall 19 and a forward wall 21. The interior surfaces of the sidewalls 17 and 18 may include a plurality of spaced vertically extending ribs 15 to define storage recesses for audio cassette-type tapes.

Figure 2:
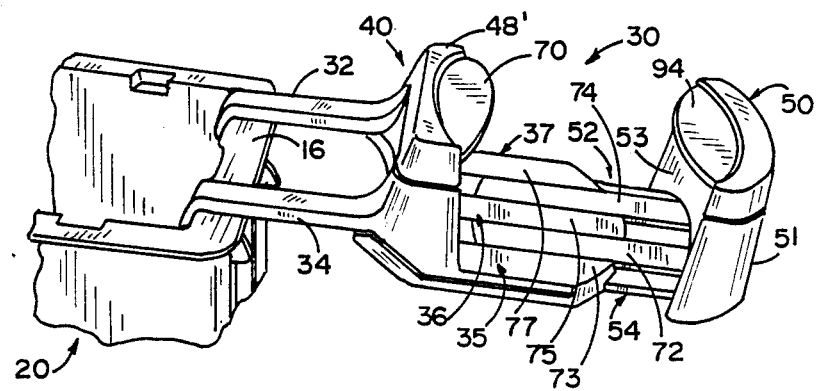
FIG. 2 is a fragmentary perspective view of the container holder extended from its stored position shown in FIG. 1 to a first use position.
Figure 3:
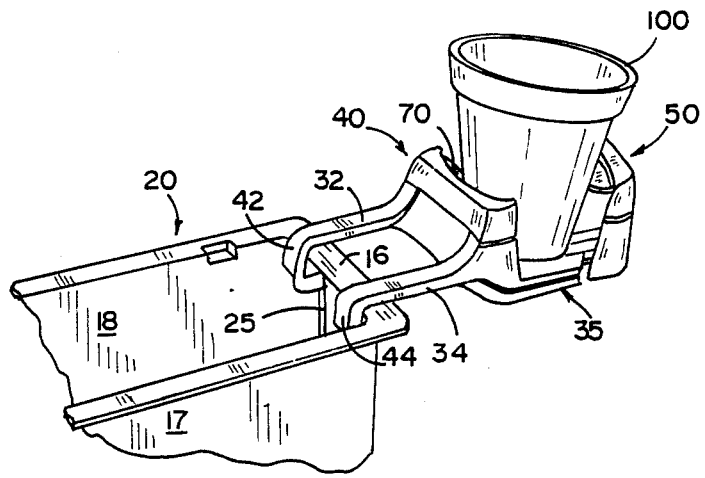
FIG. 3 is a fragmentary perspective view of the container holder shown in FIG. 2 shown in a second use position with a supported thereon.
Figure 4:
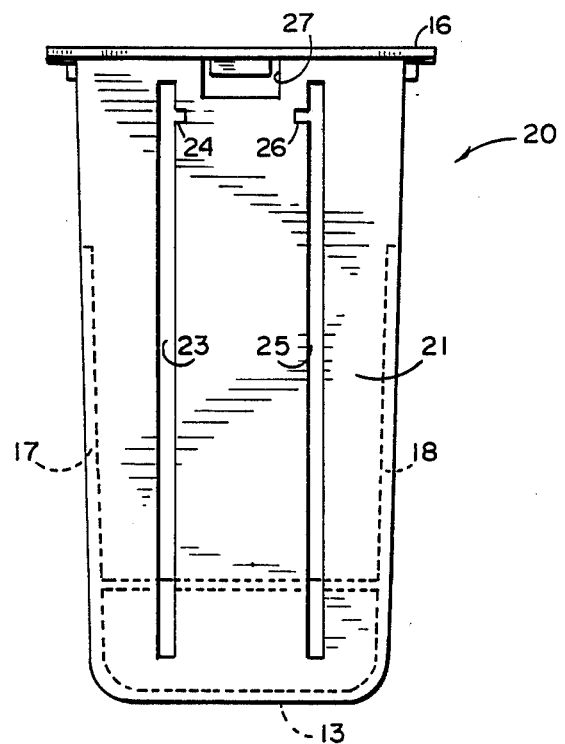
FIG. 4 is an enlarged front elevational view of the housing for the container holder shown also in FIG. 1.

The front wall 21 of housing 20, as best seen in FIGS. 1 and 4, includes a pair of vertically extending spaced parallel slots 23 and 25 with each slot including inwardly projecting notches 24 and 26 respectively near the top for lockably receiving the arms of the container holder 30 as described in greater detail below. Slots 23 and 25 extend sufficiently downwardly to allow the container holder to be slidably moved in a controlled manner to a generally vertically extending stored position within the housing 20 as illustrated in FIG. 1. For use, holder 30 is raised by sliding along slots 23 and 25 and pivoted to an extended horizontal use position as illustrated in FIGS. 2 and 3. Centrally located within the forward wall 21 of housing 20 is a notch 27 which cooperates with a latch (not shown) on the cover 12 of the armrest 10.

Figure 6:
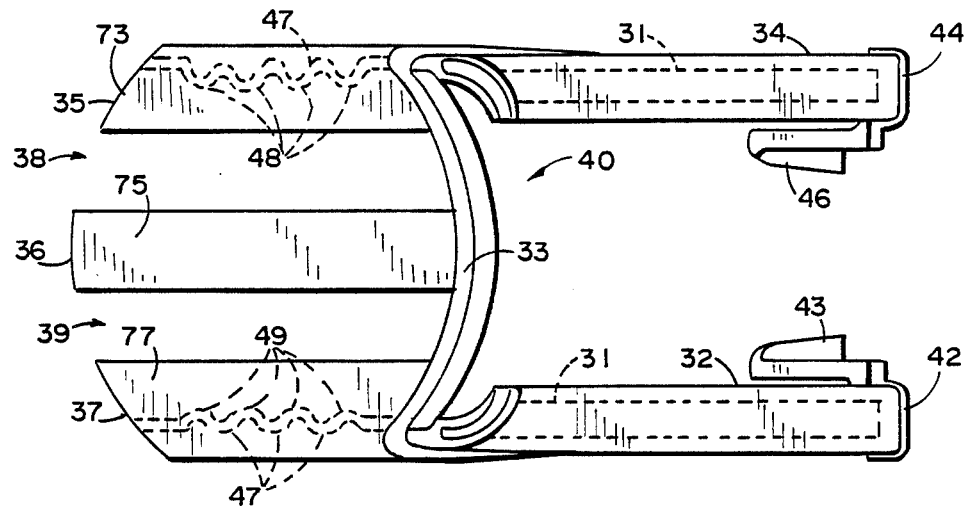
FIG. 6 is a top plan view of the pivoted support member.

The container holder 30 includes a pivoted or first support member 40 to which there is slidably coupled a sliding or second support member 50. Members 40 and 50 define opposed facing edges, the spacing of which can be adjusted to accomodate different sized containers. Member 40 includes a pair of legs 32 and 34 extending rearwardly from arcuately curved vertically extending wall 33 (FIG. 6). Extending from the lower edge of wall 33 in a direction opposite legs 32 and 34 are three spaced arms 35, 36 and 37 defining therebetween generally rectangular slots 38 and 39 for receiving projecting spaced arms of the sliding support 50 as described in greater detail below.

Figure 7:
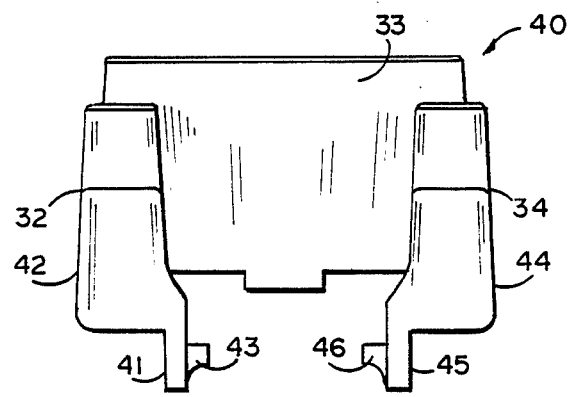
FIG. 7 is a right side elevational view of the support member shown in FIG. 6.

Each of the legs 32 and 34 are generally U-shaped in cross section defining a channel 31 (FIG. 6) under the legs. The end of legs 32 and 34 remote from curved wall 33 include downwardly projecting ends 42 and 44 respectively which terminate in forwardly projecting flanges 41 and 45 respectively having inwardly projecting tabs 43 and 46 (FIGS. 6 and 7). The flanges and tabs are lockably fitted within slots 23 and 25 of housing 20 during assembly by holding the container holder 30 in horizontal orientation as generally shown in FIG. 2 and pulling the legs 32 and 34 forwardly with tabs 43 and 46 aligned with slots 26 and 24 respectively of forward wall 21 of the housing 20. The container holder is rotated slightly in a generally vertical axis to flex the wall section 21 between slots 23 and 24 to allow the entry of flanges 41 and 45 and tabs 43 and 46 through the generally T-shaped upper ends of slots 23 and 25. Once snap fitted in position, the lower edge of the legs 32 and 34 will slip downwardly slightly and rest on the upper surface of ledge 16 as best seen in FIGS. 2 and 3 with the tabs 43 and 46 slightly below notches 24 and 26 of slots 23 and 25.

With the container holder 30 installed in the slots 23 and 25 of housing 20, it can then be rotated vertically with the tabs 43 and 46 engaging, when in a vertical position, the outer surface of wall 21 as best seen in FIG. 1 for holding the container holder 30 in a generally vertical plane when pivoted upwardly. The holder is then slid down slots 23 and 25 to a stored position as shown in FIG. 1. Tabs 43 and 46 thus captively but slidably hold the container holder to the front wall 21 of housing 20. As best seen in FIG. 6, the tabs 43 and 46 have tapered forward edges to facilitate insertion into the housing and have trailing edges which terminate in a position spaced forwardly of downwardly depending ends 42 and 44 of legs 32 and 34 respectively to allow clearance for pivoting of the container holder between the stored and use positions.

The under side of arms 35 and 37 of member 30 include a plurality of spaced inwardly projecting rounded projections 48 and 49 (FIG. 6) respectively for defining rounded indentations 47 therebetween providing detent stops for the adjustable sliding support member 50 as described below for selective adjusted use positions for different sized containers. The upper edge of wall 33 is capped by a arcuate shaped cover 48' which compressibly and lockably holds a resilient arcuate flap of foam-type polymeric material 70 between projections 49' along the lower edge of cap 48' to lock the resilient flap in place in a manner similar to that shown in FIG. 11 described below in connection with the sliding support member 50. Flap 70 tends to deflect downwardly as shown in FIG. 3 for providing a constant uniform pressure against the sidewall of the container such as a cup 100 shown in FIG. 3 as does the counterpart flap 94 mounted to sliding member 50 now described in conjunction with FIGS. 5 and 8 through 11.

Figure 5:
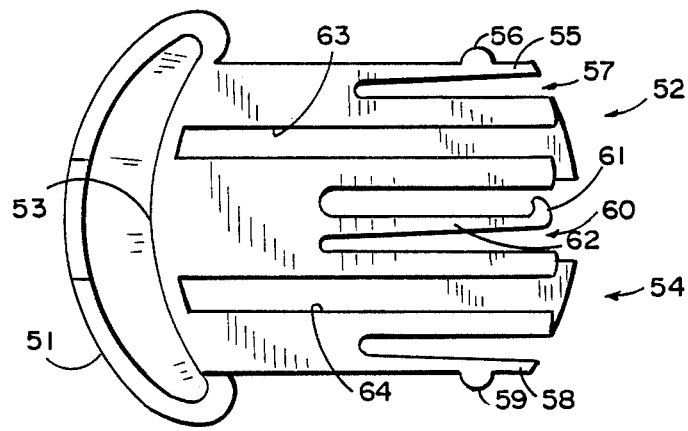
FIG. 5 is a bottom plan view of the slidable support member of the container holder shown also in FIGS. 2 and 3.

The sliding support member 50 is positioned to slidably engage and selectively, adjustably interlock to the first support member 40 and includes connected spaced arcuate generally vertically extending wall sections 51 and 53. A pair of spaced arms 52 and 54 integrally extend from the lower end of wall 53 (FIG. 5). Arm 52 includes a resilient leg 55 having a rounded projection 56 formed in the outer edge thereof with the leg defined by an integrally formed notch 57 between the main portion of arm 52 and leg 55. Projection 56 is adapted to fit within the rounded notches 47 of leg 37 of member 40 for releasably holding the leg 52 in a selectively adjusted position. Similarly, arm 54 includes an outwardly projecting resilient leg 58 having a rounded projection 59 thereon for engaging rounded notches 47 in arm 35 of member 40. Centrally positioned in a slot 60 between arms 52 and 54 is a curved resilient leg 62 having a hook-shaped latch 61 at its free end for interlocking to an upwardly projecting bar 80 integrally formed on a cover 82 mounted to the lower surface of member 40 as best seen in FIG. 10. Bar 80 as also seen in FIG. 8 is engaged by latch 61 to retain the sliding member 50 on pivoted member 40 preventing its accidental removal once assembled while allowing adjustment of the container holder between fully closed and opened positions.

The bottom of arms 52 and 54 include centrally aligned generally U-shaped slots 63 and 64 (FIG. 5). The upper surfaces 72 and 74 of arms 52 and 54 (FIG. 2) are as also seen in FIG. 9 in the same plane as the upper surfaces 73, 75 and 77 of adjacent interdigitated arms 35, 36 and 37 of member 40 to define a substantially smooth and continuous support surface for the bottom of a container such as cup 100. Like support member 40, support member 50 includes a cap 84 with a downwardly depending leg 86 having an internal downwardly projecting flange 87 which cooperates and interlocks with a peripheral upstanding flange 88 on wall 51 as best seen in FIG. 10. Cap 84 also includes a downwardly projecting lip which includes a plurality of spaced pointed projections 89 (FIG. 11) which extend downwardly into a recess 91 in the top edge of arcuate wall 53 to lockably and compressibly hold resilient flap 94 in position in the same manner as flap 70 is held by cap 48'.

Each of the members 30, 40 and 80 as well as caps 84 and 48' are integrally molded of a resilient polymeric material such as A.B.S. or polycarbonate. The arms 52 and 54 of sliding support 50 are captively held between the lower surface of arms 35, 36 and 37 of member 40 and the upper surface 81 of cover 80 as best seen in FIG. 10 to prevent tilting of the sliding member holding it in a generally horizontal plane with member 40 when extended to the use position shown in FIGS. 2 and 3. The container holder is assembled by first mounting resilient members 70 and 94 between the respective support members and their caps and ultrasonically welding or otherwise bonding the caps in position. Members 40 and 50 are then put together with arms 52 and 54 fitted between the arms 35, 36 and 37 and particularly in the slots 38 and 39 therebetween (FIG. 6) until latch 61 engages locking bar 80. The cover 82 is then positioned over the arms 52 and 54 and secured in place by suitable fastening means such as bonding adhesive, ultrasonic welding, or the like to form the container holder assembly 50. Assembly 50 is then snap-fitted and locked into the storage housing 20 as described above which in turn is mounted to the armrest 10 for installation in a vehicle.

By providing the resilient legs 55 and 58 (FIG. 5), the sliding cup supporting member 50 can be slid to at least four detented positions for different sized containers such as cups, cans, mugs, and the like. Flaps 70 and 90 are made of a resilient foam material either open or closed cell and deflect as illustrated in FIG. 3 to provide a constant pressure to the container rested upon the floor defined by surfaces 72–77 of the interfitting arms of the members 40 and 50. As best seen in FIGS. 2, 3 and 8, the side edges of the container holder 50 are generally flattened to provide a somewhat narrow profile allowing the container holder to fit in the relatively small rectangular housing 20. By providing the truncated arcuate walls 33, 51 and 53 with the resilient flaps 70 and 94, a container holding support is provided which arcuately circumscribes opposite edges of the container. The cupholder, thus, provides opposed facing support edges which are arcuate in shape and which are adjustably spaced from one another for providing container holding support for different sized containers. The resilient flaps 70 and 94 may or may not be employed as illustrated in FIG. 9; however, they have been found to be particularly useful in providing frictional contact with the sidewalls of the container such as a tapered cup 100 shown in FIG. 3 and yet easily allow the container to be inserted and removed from the container holder.

It will become apparent to those skilled in the art that these and various other modifications of the preferred embodiment of the invention described herein can be made without departing from the spirit or scope thereof as defined by the appended claims.

I claim:

1. A vehicle armrest and container holder assembly comprising:
    an armrest for mounting to a vehicle; and
    a container holder and means for mounting said holder to said armrest, said holder including a first container supporting member having a first vertical member and a first set of a plurality of arms extending in a generally horizontal plane in a direction away from said vertical member and from said armrest, said holder further including a second supporting member having a second vertical member and a second set of a plurality of arms extending in a direction away from said second vertical member and toward said armrest; said first and second set of arms being positioned and shaped to telescope one set with respect to the other so as to provide a plurality of spaced-apart positions of said first and second vertical members such that facing edges of each of said vertical members of said supporting members can be spaced apart a selectable distance for holding different sized containers; said first and second sets of telescoping arms defining a floor means for supporting a container.

2. The apparatus as claimed in claim 1 wherein said first and second supporting members include interlocking arms defining floor means.

3. The vehicle container holder of claim 1 in which said armrest includes a housing; arm support means for pivotally supporting said first vertical member on said housing for pivotally moving said container holder from an extended container holding position to a storage position in said housing; means for permitting said arms and said container holder when said second vertical member is moved to a position closest to said first vertical member to be stored within the confines of said housing.

4. A vehicle armrest and container holder assembly comprising:
    an armrest for mounting to a vehicle;
    a container holder and means for mounting said holder to said armrest, said holder including a first container supporting member extending in a generally horizontal plane for use, said holder further including a second supporting member slidably coupled to said first member for movement between plurality of spaced-apart positions such that facing edges of said supporting members are spaced-apart a selectable distance for holding different sized containers, wherein said first and second supporting members include interlocking arms defining floor means; and
    wherein said interlocking arms include detent means for detenting said second supporting member at a plurality of different positions with respect to said first supporting member.

5. The apparatus as defined in claim 4 wherein said facing edges of said supporting members include resilient sections for deflection upon insertion of a container therein such that said sections can engage the container.

6. The apparatus as defined in claim 1 wherein said means for mounting said holder to said armrest includes a housing for storably receiving said holder.

7. A vehicle armrest and container holder assembly comprising:
    an armrest for mounting to a vehicle;
    a container holder and means for mounting said holder to said armrest, said holder including a first supporting member extending in a generally horizontal plane for use, said holder further including a second supporting member slidably coupled to said first member for movement between a plurality of spaced-apart positions such that facing edges of each of said supporting members are spaced-apart a selectable distance for holding different sized container, wherein said means for mounting said holder to said armrest includes a housing for storably receiving said holder; and
    wherein said first supporting member includes at least one pivot arm extending therefrom in a direction opposite said facing edge of said first supporting member and wherein said housing includes slot means for lockably receiving said pivot arm for allowing said arm to pivot and slide such that said holder can be moved from a stored position within said housing to a use position extended from said housing.

8. The apparatus as defined in claim 7 wherein said first supporting member includes a pair of spaced parallel pivot arms each having means at an end for locking to said housing.

9. The apparatus as defined in claim 8 wherein said locking means comprises a flange having orthogonal tab means.

10. A vehicle container holder comprising:
    a first container supporting member having a vertically extending portion;
    a second supporting member having a vertically extending portion; said first and second supporting members having means for slidably coupling said second supporting member for movement between a plurality of spaced-apart positions from said first supporting member such that the vertically extending portions of each of said supporting members can be spaced apart a selectable distance for holding different sized containers; said first and second members each having elongated floor support members extending from said vertically extending portion toward the other of said vertically extending portion in a telescopic relationship and forming the floor for supporting a container; and
    means for mounting said first container supporting member to a vehicle.

11. A vehicle container holder comprising:
    a first container supporting member;
    a second supporting member slidably coupled to said first member for movement between plurality of spaced-apart positions such that facing edges of each of said supporting members are spaced-apart a selectable distance for holding different sized containers; and
    means for mounting said first container supporting member to a vehicle, wherein said means for mounting said first container supporting member includes a wall having slot means for receiving and holding a portion of said first container supporting member said first container support member includes at least one pivot arm for pivoting said first container support member from an operative container holder position at one side of side wall thereof, in which position at said opposite side of said wall said slot means allows said arm to slide downwardly into a storage position.

12. The apparatus as defined in claim 11 wherein said pivot arm of said first supporting member extends therefrom in a direction opposite said facing edge of said first supporting member and wherein said slot means includes a notch for lockably receiving an end of said pivot arm for allowing said arm to pivot and slide such that said holder can be moved from a stored position parallel to said wall to an operative position extended from said wall.

13. The apparatus as defined in claim 12 wherein said first and second supporting members include interlocking arms defining floor means.

14. The apparatus as defined in claim 13 wherein said interlocking arms include detent means for detenting said second supporting member at a plurality of different positions with respect to said first supporting member.

15. The apparatus as defined in claim 14 wherein said facing edges of said supporting members include resilient sections for deflection upon insertion of a container therein such that said sections engage the container.

16. The apparatus as defined in claim 15 wherein said first supporting member includes a pair of spaced parallel pivot arms each having means at an end for locking to said wall.

17. The apparatus as defined in claim 16 wherein said locking means comprise a flange having orthogonal tab means.

18. A container holder comprising:
 a first member including an arcuate vertically extending wall having a first concave surface and a plurality of spaced arms extending from a lower end thereof away from said first concave surface of said wall; and
 a second member including an arcuate vertically extending wall having a second concave surface and a plurality of spaced arms extending from a lower end thereof and away from said second concave surface of said wall of said second member towards said first concave surface, said arms of said first and second members positioned and shaped to slidably interengage one another for slidably coupling said first and second members together, said arms having an upper surface defining floor means for supporting containers thereon of different sizes as said second member is moved with respect to said first member.

19. The apparatus as defined in claim 18 and further including detent means extending between at least one pair of adjacent arms for selectively holding said first and second members at predetermined spacings.

20. The apparatus as defined in claim 19 wherein said walls each include a resilient flap mounted thereto near an upper portion thereof and extending toward the remaining wall for engaging a container.

21. The apparatus as defined in claim 20 and further including means for mounting said first member to a vehicle.

* * * * *

UNITED STATES PATENT AND TRADEMARK OFFICE
CERTIFICATE OF CORRECTION

PATENT NO. : 4,943,111

DATED : July 24, 1990

INVENTOR(S) : Kenneth J. Vanderlaan

It is certified that error appears in the above-identified patent and that said Letters Patent is hereby corrected as shown below:

Column 1, Line 63;
After "with a" insert --container--

Column 3, Line 34;
"by a" should be --by an--

Column 5, Line 35;
"claimed" should be --defined--

Column 6, Lines 17 & 18, Claim 7;
"container" should be --containers--

Column 8, Line 2, Claim 17;
"comprise" should be --comprises--

Signed and Sealed this

Twelfth Day of March, 1991

Attest:

HARRY F. MANBECK, JR.

Attesting Officer

Commissioner of Patents and Trademarks